Sept. 7, 1954   G. S. WILSON   2,688,498
HOSE CLAMP
Filed Oct. 8, 1951

INVENTOR.
George S. Wilson
BY
ATTORNEY

Patented Sept. 7, 1954

2,688,498

UNITED STATES PATENT OFFICE 2,688,498

HOSE CLAMP

George S. Wilson, Far Hills, N. J.

Application October 8, 1951, Serial No. 250,292

2 Claims. (Cl. 285—84)

This invention relates to hose clamps and, more particularly, to novel, simple and efficient means for providing a fluid-tight seal between a hose member, of compressible material, and a nipple or coupling of relatively rigid material.

This invention has particular applicability for incorporation in hose assemblies defining flexible lines for transmitting fluids, whether liquid or gaseous, under pressures and vacuums from very low to very high values.

For example, this invention, on the one hand, may be applied in the assembly of flexible lines such as hose lines, wherein fluid pressures are relatively low as, for example, household garden hose, automobile radiator hose or flexible lines feeding fuel or like fluid. On the other hand, it has particular applicability where fluid pressures or suction values are relatively high in the following branches of industry: in hydraulic circuits, where hose assemblies are required for hydraulic controls in machine tools, farm implements, aircraft, road building equipment and power machinery; in the automotive and marine fields, where flexible lines are required for hydraulic and lubrication lines; in refrigeration and air conditioning fields, where flexible hose assemblies are required for fluid pressure and suction lines; in aeronautical fields, where fuel, oil or other fluid is distributed at various pressures from low to high pressures, or at suction from low to high values; and in activities where hose assemblies of considerable diameter are involved, namely fire hose, refueling hose and suction hose used in connection with hydraulic pumps in mining and analogous operations.

Among other features, the invention hose coupling may be re-used. For example, should a coupled hose become broken, the invention coupling can be removed, the damaged hose section cut off, and the coupling re-applied to the undamaged hose section. Thus, a burst plastic hose can be repaired, which has hitherto not been generally possible.

The invention coupling can be used in place of the present screw clamp couplings used on automotive radiator hose, being just as easily secured to the hose ends. Furthermore, it can be easily applied to service air hoses, replacing the present factory applied clamp coupling which can only be replaced with special equipment.

In contrast to present commonly used hose couplings, the present invention provides a novel hose clamp which may be quickly and easily applied either as new or replacement equipment. Specifically, a metal collar is provided having internal surface engagement with a flexible hose fitted over a rigid nipple or fitting. The collar has a radial aperture of substantial axial length and with a pair of non-radial, preferably substantially parallel walls. This collar is placed over a hose fitted onto a relatively rigid nipple or fitting having external ridges between its ends and a relatively large diameter rib or shoulder on its inner end. The end of a filamentary member such as a wire or strap of predetermined diameter or thickness, is then introduced into the aperture and inserted between the hose and the collar. As the collar is turned relative to the hose, the wire or the like is drawn through the aperture and between the hose and the collar, deforming the hose wall between the nipple or fitting and the collar. The fitting ridges bite into the hose wall and the wall material compressed against the fitting outwardly of the large inner end rib effectively locks the parts together. The number of wire convolutions is determined by the length of the radial aperture, and a tight sealing fit of the hose against the nipple is effected by the hose wall compressing effect of the wire. The clamp is easily released by reversing the relative rotation of the hose and collar, which withdraws the wire outwardly through the collar aperture.

For an understanding of the invention principles, reference is made to the following description of a typical embodiment thereof as illustrated in the accompanying drawing, in which.

Figure 1:
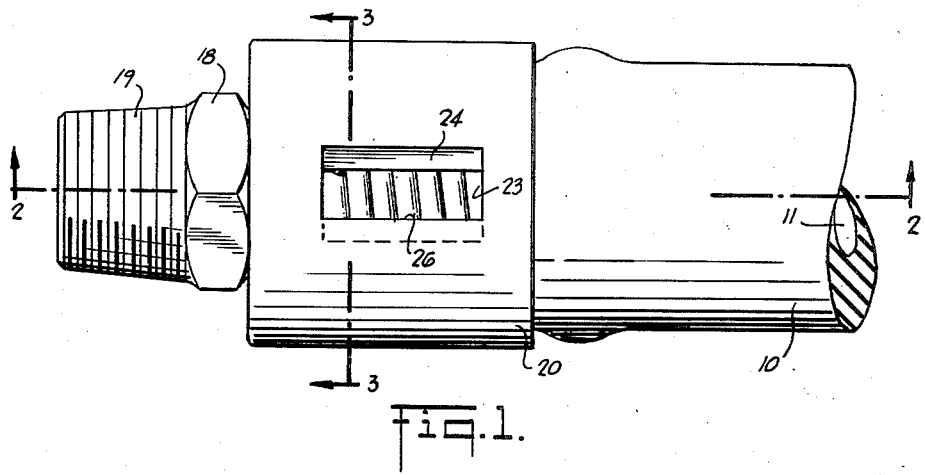
Fig. 1 is an elevation view of the invention hose clamp arrangement.

Referring to the drawings, the invention is illustrated as utilized to sealingly clamp a compressible material hose 10 to a fitting or nipple 15 having ridges 16, intermediate its ends, a large diameter rib 17, at its inner end, a wrench receiving shoulder 18, and a threaded outer end 19. Hose 10 has a fluid passage 11 receiving the inner end of nipple or fitting 15.

The clamp includes a collar 20 having an inturned flange 21 at its outer end. The circumferential wall 22 of the collar has a radial opening 23 extending throughout a substantial part of the length of wall 22. Opening 23 has circumferentially spaced edges 24, 26 which are substantially parallel to each other but are non-radial. Edges 24, 26, in effect, form an inwardly sloping leading edge and an outwardly sloping trailing edge when collar 20 is rotated.

Figure 2:
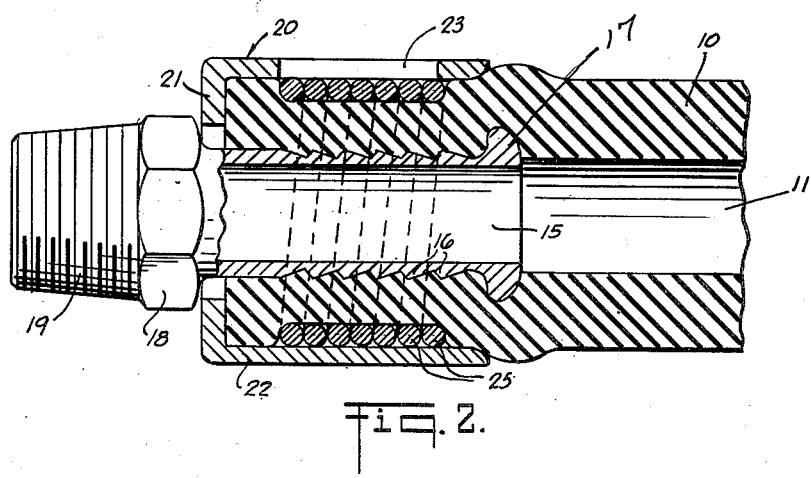
Fig. 2 is an axial sectional view thereof.

In the preferred method of assembling the clamp upon the hose, the nipple 15 is inserted through the end aperture of the collar 20 defined by the flange 21, so that the inner rib 17 of the nipple projects slightly beyond the mouth of the collar with the shoulder 18 of the nipple resting against the flange 21. This unit is then applied to the open end of a hose 10 with the nipple being urged into the hose passage 11, while the collar passes over the outer periphery of the hose, the rib 17 of the nipple being at all times in advance of the free end of the collar 20, and both nipple and collar being maintained in the aforementioned relationship as the nipple and collar are fitted onto the free end of the hose 10 (see Fig. 2).

Figure 3:
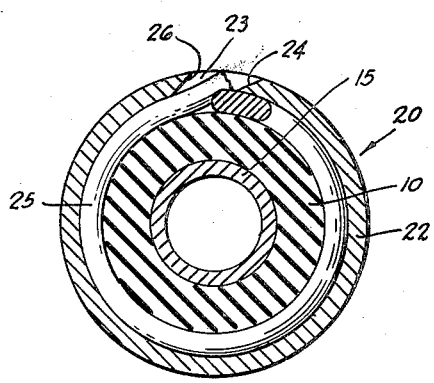
Fig. 3 is a diametric sectional view thereof on the line 3—3 of Fig. 1.

The clamping is completed by feeding the end of a filamentary member 25, such as a copper wire, into recess 23 and beneath edge 26. As the collar 20 is rotated clockwise, as viewed in Fig. 3, wire 25 passes through aperture 23 and is wrapped around hose 10 beneath wall 22 of collar 20. The wire thus deforms the hose wall into firm interlock with barbs 16 and between sleeve 22 and rib 17, thus compressing the hose into firm interlocking engagement with nipple 15, the number of wire convolutions being primarily determined by the length of aperture 23. To release the clamp, the rotation of collar 20 is reversed, causing wire 25 to feed outwardly through recess 23.

While a specific embodiment of the invention has been shown and described in detail to illustrate the application of the invention principles, it will be understood that the invention may be embodied otherwise without departing from such principles.

What is claimed is:

1. A coupling for a compressible cylindrical walled hose comprising, in combination, a relatively rigid, substantially tubular fitting having an inner end engageable in the end of the hose, said inner end having a plurality of axially spaced and axially outwardly facing circumferential projections intermediate its length, deforming portions of the hose wall outwardly, and an out-turned flange at its innermost end having a diameter substantially greater than that of said projections; a cylindrical collar having a smooth substantially cylindrical inner surface whose diameter is substantially equal to the outer diameter of the hose and greater than the outer diameter of said projections, and whose length is less than that of the inner end of said fitting, the inner end of said collar being substantially radially aligned with said out-turned flange when the collar is assembled on the hose; said collar having an inturned annular flange at its outer end whose inner diameter is greater than the diameter of said out-turned flange, whereby said collar may be slipped over the end of the hose; the circumferential wall of said collar having a substantially rectangular radial aperture therethrough extending through a minor fraction of the wall circumference and having a length substantially equal to the longitudinal extent of said projections, one longitudinal edge of said aperture being non-radial and sloping inwardly and downwardly under said circumferential wall; and a flexible substantially non-compressible wire having an end insertable beneath such sloping edge adjacent one end of the latter and a diameter at least equal to the radial height of said projections; the length of said aperture being greater than the diameter of said wire; whereby, as said collar is rotated with such sloping edge leading and said wire fed helically, said wire will feed between the smooth inner cylindrical surface of said collar and the cylindrical outer surface of said hose forming a single layer of adjacent helical convolutions throughout the length of said aperture compressibly deforming the hose wall tightly over the projections on said fitting to lock said fitting to said hose; the compressibly deformed hose material axially outwardly of said out-turned flange forming a firm abutment preventing withdrawal of said fitting from the hose until the wire is withdrawn through said aperture by reverse rotation of said collar.

2. A coupling as claimed in claim 1 in which the opposite longitudinal edge of said aperture is non-radial and sloping upwardly and outwardly to feed the wire out through said aperture as the collar is rotated in the opposite direction to unwind the wire convolutions.

References Cited in the file of this patent

UNITED STATES PATENTS

| Number | Name | Date |
|---|---|---|
| 1,966,368 | Williams | July 10, 1934 |
| 2,143,279 | Osborn | Jan. 10, 1939 |

FOREIGN PATENTS

| Number | Country | Date |
|---|---|---|
| 169,920 | Great Britain | Oct. 13, 1921 |
| 737,798 | France | Oct. 10, 1932 |
| 719,973 | Germany | Apr. 21, 1942 |